United States Patent [19]

Hoxmeier

[11] Patent Number: 4,992,529

[45] Date of Patent: Feb. 12, 1991

[54] METHOD FOR SEPARATING METAL CONTAMINANTS FROM ORGANIC POLYMERS

[75] Inventor: Ronald J. Hoxmeier, Houston, Tex.

[73] Assignee: Shell Oil Company, Houston, Tex.

[21] Appl. No.: 113,976

[22] Filed: Oct. 29, 1987

[51] Int. Cl.$^5$ .............................. C08F 6/08; C08F 6/24
[52] U.S. Cl. .................... 528/486; 528/483; 528/487; 528/490; 528/491
[58] Field of Search ............... 528/486, 487, 490, 483, 528/491

[56] References Cited

U.S. PATENT DOCUMENTS

| | | | |
|---|---|---|---|
| 2,893,982 | 7/1959 | Campbell | 260/85.1 |
| 3,070,589 | 12/1962 | Kirch et al. | 528/486 X |
| 3,114,742 | 12/1963 | Solvik et al. | 528/490 X |
| 3,269,997 | 8/1966 | Lyons et al. | 528/486 X |
| 3,531,448 | 9/1970 | Johnson | 260/85.1 |
| 3,554,911 | 1/1971 | Schiff et al. | 252/59 |
| 3,668,125 | 6/1972 | Anderson | 252/59 |
| 3,700,633 | 10/1972 | Wald et al. | 260/880 B |
| 3,740,381 | 6/1973 | DiDrusco | 528/486 |
| 3,772,196 | 11/1973 | St Clair et al. | 252/32.7 E |
| 3,775,329 | 11/1973 | Eckert | 252/59 |
| 3,780,138 | 12/1973 | Hassell et al. | 260/880 B |
| 3,793,306 | 2/1974 | Farrar et al. | 260/85.1 |
| 3,835,053 | 9/1974 | Meier et al. | 252/59 |
| 4,028,485 | 6/1977 | Poloso et al. | 528/486 |
| 4,116,917 | 9/1978 | Eckert | 260/33.6 AQ |
| 4,156,673 | 5/1979 | Eckert | 260/33.6 AQ |
| 4,476,297 | 10/1984 | Kablitz et al. | 528/486 |
| 4,595,749 | 6/1986 | Hoxmeier | 528/483 |
| 4,595,759 | 6/1986 | Davidson et al. | 547/234 |

FOREIGN PATENT DOCUMENTS

| | | | |
|---|---|---|---|
| 1030306 | 5/1966 | Netherlands. | |
| 0840861 | 7/1960 | United Kingdom | 528/490 |
| 0993599 | 5/1965 | United Kingdom | 528/490 |

*Primary Examiner*—Fred Teskin

[57] ABSTRACT

A method for separating metal residues from a polymer wherein a solution or suspension of said polymer is contacted with an aqueous solution containing one or more inorganic acids in the presence of a monocarboxylic acid containing from about 6 to about 20 carbon atoms. The polymer solution or suspension will be contacted with an oxidizing agent either prior to or simultaneously with the contacting with the aqueous inorganic acid solution. The inorganic acid is, preferably, a mineral acid and the monocarboxylic acid is preferably a branched chain alkanoic acid having from about 6 to about 10 carbon atoms. When a monocarboxylic acid is used in combination with the inorganic acid, the amount of metal removed from the polymer is increased and the amount of the aqueous phase containing ionized metal entrained in the organic phase is sugnificantly reduced.

13 Claims, No Drawings

METHOD FOR SEPARATING METAL CONTAMINANTS FROM ORGANIC POLYMERS

BACKGROUND

1. Field of the Invention

This invention relates to a method for separating various contaminants form organic polymers. More particularly, this invention relates to a method of separating metal contaminants from organic polymers.

2. Prior Art

It is, of course, well known in the prior art that various metal contaminants are, frequent]y, undesirable in organic polymers and organic polymer compositions since such contaminants frequently accelerate deterioration of the polymer and may interfere with subsequent curing reactions. Metals may be introduced into the polymer either as catalyst( during polymerization or as catalyst during a subsequent treatment such as hydrogenation of an unsaturated polymer.

Heretofore several processes have been proposed for separating various metals from organic polymers. These processes generally involve reaction of the metal or a compound thereof with a reagent thereby forming a product which can then be separated. Generally, the product will be insoluble in the organic phase and may be removed therefrom either via extraction into an inorganic phase or by filtration or the like. Suitable reagents include mineral acids such as taught in U.S. Pat. No. 2,893,982 as well as carboxylic acids such as taught in U.S. Pat. Nos. 2,893,982; 3,780,138; 4,476,297 and 4,595,749. Other suitable reagents include the ammonium phosphates such as taught in U.S. Pat. Nos. 3,531,448 and 3,793,306. Carboxylic acids may be used in combination with other reagents such as an anhydrous base as taught in U.S. Pat. No. 4,028,485 or an aliphatic alcohol as taught in U.S. Pat. No. 3,780,138. An oxidizing agent may also be used prior to or simultaneously with the reagent used to react with the metal or metal compound such as tau&ht in U.S. Pat. Nos. 3,780,138; 3,793,306 and 4,595,749.

As is well known, most, if not all, of the aforementioned processes are effective in significantly reducing the amount of metal remaining in the polymer after treatment. None, however, are effective in removing all of the metal and certain of these processes frequently leave more metal in the polymer than is desired in many end uses for the polymer. Moreover, those processes involving the use of an aqueous phase generally result in higher concentrations of metal in the polymer due to entrainment of the aqueous phase in the organic, polymer phase. In light of this, the need for an improved process for separating various metals from organic polymers is believed to be readily apparent.

SUMMARY OF THE INVENTION

It has now been discovered that the foregoing and other disadvantages of the prior art processes for separating various metals from polymeric materials can be avoided or at least significantly reduced with the method for separating metals from polymeric materials of this invention and an improved process for separating metals from polymeric materials provided thereby. It is, therefore, an object of this invention to provide an improved process for separating various metals from polymeric materials. It is another object of this invention to provide such an improved process wherein an aqueous phase is used with reduced entrainment thereof in the polymer phase. The foregoing and other objects and advantages will become apparent from the description of the invention set forth hereinafter and :rom the examples included therein.

In accordance with the present invention, the foregoing and other objects and advantages are accomplished with a process wherein a higher molecular weight monocarboxylic acid is used in combination with an inorganic acid. It is important to the present invention that the polymer be dissolved or suspended in an organic media and that the metal component or components contained in the polymer be contacted with an oxidizing agent either prior to or simultaneously with the contacting with the mixture o: acids. Separation will be accomplished by contacting the polymer solution or suspension with an aqueous solution of an inorganic acid in the presence of a higher molecular weight monocarboxylic acid. The separation is accomplished such that the metal or metals to be separated from the polymer are ultimately dissolved in the aqueous phase as a reaction product of the inorganic acid while the higher molecular weight monocarboxylic acid remains in the organic phase with the polymer. The monocarboxylic acid may be subsequently separated from the organic phase and reused.

DETAILED DESCRIPTION OF THE INVENTION

As indicated supra, the present invention is drawn to a method for separating metals from polymeric materials. It is important to the present invention that the polymeric material containing the metal or metals be dissolved or suspended in an organic media. Separation of the metal or metals is accomplished by contacting the polymer solution or suspension with an aqueous solution comprising at least one inorganic acid in the presence of at least one relatively high molecular weight monocarboxylic acid. The metal or metals to be separated will be contacted with a suitable oxidizing agent either prior to contacting with the aqueous inorganic acid solution or simultaneously therewith. Separation of the metal or metals from the polymer is accomplished such that the metal or metals become dissolved in the aqueous phase as reaction products of the inorganic acid or acids while the higher molecular weight monocarboxylic acid or acids remain with the polymer in the organic media. The relatively high molecular weight monocarboxylic acid may then, subsequently, be separated from the organic media and reused in the separation process.

In general, the method of this invention can be used to separate any of the metals commonly found in polymers so long as the polymer may be either dissolved or suspended in an organic media. Metals which may be separated include: the metals of Group IA of the Table of Periodic Properties of the Elements, particularly sodium and lithium which are frequently used as anionic polymerization initiators; the metals of Groups IIA and IIIB, particularly magnesium and aluminum which are frequently contained as a component (the reducing agent) in a hydrogenation catalyst; the metals of Group IVA, particularly titanium and zirconia which are frequently contained in cationic polymerization initiators; and the metals of Groups V8, V18 and VIIIA, particularly cobalt, nickel and molybdenum which are frequently used as hydrogenation catalyst. All reference to Groups of the Table of Periodic Properties of the Elements herein will be to the Table of Periodic Properties of the Elements as published and copyrighted by Sargent-Welch Scientific Company in 1980. It will, of course, be appreciated that any metal which will react with the inorganic acids useful in the method of this invention can also be separated from a solution or suspension of a polymer using the method of this invention. Metals other than those specifically mentioned are, however, less commonly found in such polymers.

In general, the method of this invention may be used to separate metals from any of the polymers known in the art which can be either dissolved or suspended in an organic media. The method of this invention can, then, be used to separate metals from such polymers as those containing alpha olefin monomer units, diolefin monomer units, monoalkenyl aromatic hydrocarbon monomer units, polyalkenyl aromatic hydrocarbon monomer units and the like. The method of the present invention is particularly effective for separating metal residues from polymers which have been prepared with cationic initiators, metal residues from polymers which have been prepared via anionic initiation and metal residues in polymers which have been hydrogenated in the presence of a metal containing catalyst. Polymers commonly prepared via cationic initiation include homopolymers of the various alpha olefins, copolymers of two or more different alphaolefins and copolymers of at least one alphaolefin and at least one polyolefin. Polymers prepared via anionic initiation include homopolymers of the conjugated diolefins, copolymers of two or more conjugated diolefins, copolymers of one or more conjugated diolefins and one or more monoalkenyl aromatic hydrocarbons, homopolymers of monoalkenyl aromatic hydrocarbons and copolymers of monoalkenyl aromatic hydrocarbons. Unsaturated polymers which are frequently hydrogenated include homopolymers of conjugated diolefins, copolymers of two or more conjugated diolefins, copolymers of at least one conjugated diolefin and at least one monoalkenyl aromatic hydrocarbon and the like. The polymer may be random, tapered or block.

In general, any inorganic acid may be used in the method of the present invention to effectively react with and separate the metal atoms contained in the polymer solution or suspension. The inorganic acid may be monoprotic or polyprotic. It is, however, important that the ionization constant for at least one hydrogen atom contained in the acid be greater than or equal to about $1 \times 10^{-5}$. Suitable inorganic acids include but are not limited to, the hydrogen halides such as hydrogen chloride, hydrogen bromide, hydrogen fluoride and the like, the various sulfur containing acids such as sulfurous acid, sulfuric acid and the like; the various phosphorus containing acids such as phosphorus acid, phosphoric acid and the like, nitric acid, chloric acid, perchloric acid and the like. The mineral acids such as hydrochloric acid, nitric acid, phosphoric acid, sulfuric acid and the like, are particularly effective when used in the method of this invention and are, therefore, preferred.

In general, any monocarboxylic acid that is significantly more soluble in an organic media than in an inorganic media such as water can be used as the monocarboxylic acid in the method of this invention. In this regard, it is important to the method of this invention that at least about 90 wt % of the monocarboxylic acid remain in the organic media in which the polymer is either dissolved or suspended after the separation of the metal or metals is completed and that not more than about 10 wt % of said monocarboxylic acid be contained in the aqueous phase when the separation is completed. Suitable monocarboxylic acids may be represented by the following general formula:

$$RCO_2H$$

wherein: R is a hydrocarbyl radical containing from about 6 to about 20 carbon atoms. The hydrocarbyl radical may be a linear or branched alkyl radical, a cyclic hydrocarbyl radical, an alkyl-substituted cyclic hydrocarbyl radical, an aromatic radical, an alkyl-substituted aromatic radical and the like. Suitable monocarboxylic acids include, but are not limited to, linear aliphatic monocarboxylic acids such as caproic, enanthic, caprylic, pelargonic, capric, undecanoic, lauric and the like; branched chained monocarboxylic acids such as methylpentanoic acid, methyl- and ethylhexanoic methyl and ethylheptanoic acids, methyl- and ethyloctanoic acids, methyl- and ethylnonanoic acids, methyl- and ethyldecancic acids, and the like; cyclic monocarboxylic acids such as cyclohexanoic acid, cyclohexanoic acid, cyclooctanoic acid and the like; alkyl-substituted cyclic monocarboxylic acids such as methyl- and ethylcyclohexanoic acids, methyl- and ethylcycloheptanoic acids, methyl- and ethylcyclooctanoic acids and the like; aromatic acids such as benzoic acid and the like; alkyl-substituted aromatic acids such as the toluic acids, p-t-butylbenzoic acid and the like.

In general, any hydrocarbon which is liquid at the conditions at which the separation of the metal or metals is accomplished may be used as the organic media in which the polymer is either dissolved or suspended in the method of this invention. Suitable hydrocarbons which are useful either as a solvent or diluent, then, include, but are not limited to straight and branched chained aliphatic hydrocarbons, cyclic hydrocarbons, substituted cyclic hydrocarbons, aromatic hydrocarbons, substituted aromatic hydrocarbons and the like. Representative examples of useful hydrocarbons include pentane, hexane, heptane, octane, cyclopentane, cyclohexane, cycloheptane, benzene, toluene, xylene and the like.

As indicated supra, the inorganic acid and the monocarboxylic acid will be used in combination with a suitable oxidizing agent. As also indicated supra, the oxidizing agent may be used prior to or simultaneously with the acid mixture. In general, the particular oxidizing agent selected is not critical to the present invention and any known oxidizing agent may be used. Suitable oxidizing agents include air, oxygen, peroxides, hydroperoxides and the like. Suitable peroxides and hydroperoxides include, but are not limited to, hydrogen peroxides and the primary, secondary or tertiary alkyl and aryl peroxides and hydroperoxides. Alkyl hydroperoxides such as ethyl hydroperoxide, butyl hydroperoxide, isopropyl hydroperoxide, tertiary butyl hydroperoxide and the like are particularly useful as oxidizing agents in the present invention.

As indicated supra, the inorganic acid will be used in aqueous solution. Obviously, a mixture of such acids could be used. Also, the inorganic acid or acids and the monocarboxylic acid or acids may, initially, be combined into the aqueous solutions or separate solutions of each could be prepared and then combined prior to contacting with the polymer solution or suspension or the separate solutions may be separately contacted with the polymer solution or suspension. In this regard, it should be noted that the monocarboxylic acid or acids could also be added directly to the polymer solution or suspension or the monocarboxylic acid or acids could first be dissolved in an organic solvent, which may be the same as the organic media used in the polymer solution or suspension, and then contacted with the polymer solution or suspension.

In general, the concentration of inorganic acid in the aqueous solution is not critical to the present invention. It is, however, important to the method of this invention that a sufficient amount of water be present during contact to insure that the reaction product of the metal or metals to be separated and the inorganic acid or acids is dissolved in said aqueous phase prior to its separation from the organic phase containing the polymer. It is also important in the method of the present invention that sufficient inorganic acid be used to insure complete reaction of the inorganic acid or acids with the metal or metals to be separated. When good contacting between the organic phase and the aqueous phase is maintained, the reaction between the metal or metals and the inorganic acid will occur stoichiometrically. Use of a amount of inorganic acid just slightly in excess of this stoichiometric amount will, then, generally be sufficient to insure at least substantially complete reaction and subsequent separation of the metal or metals contained in the polymer solution or suspension.

While the inventor does not wish to be bound by any particular theory, it is believed that the monocarboxylic acid acts simply as a phase transfer catalyst thereby facilitating movement of the metal or a reaction product thereof, such as the reaction product formed with the inorganic acid, from the organic phase to the aqueous phase. To the extent that the metal or metals do not react with one or more of the inorganic acids present during contacting in the organic phase such a reaction could then occur in the aqueous phase. To the extent that the anion of the monocarboxylic acid combines with a metal and then moves to the aqueous phase reaction of the organic salt with an inorganic acid would restore the monocarboxylic acid, thereby enabling the return of the monocarboxylic acid to the organic phase where further reaction or phase transfer could be effected. In any case, it has been determined that all, or at least substantially all (90 wt %) of the monocarboxylic acid or acids used during the separation will be in the organic phase as the acid after the organic phase is separated from the aqueous phase. The metal or metals separated from the polymer, on the other hand, will be contained in the aqueous phase as a salt formed by reaction with an anion contained in the inorganic acid or acids used. Surprisingly, it has been discovered that the amount of metal or metals actually separated is significantly increased when a monocarboxylic acid is used in combination with one or more inorganic acids even though the monocarboxylic acid remains chemically unchanged after the separation has been completed.

Since the monocarboxylic acid apparently acts only as a phase transfer catalyst, the amount of such acid used during the contacting step may be significantly less than the amount of inorganic acid used (on a molar or equivalent basis). In fact, improved separation of the metal or metal components from the polymer will be realized when as little as 0.05 equivalents of monocarboxylic acid per equivalent of total metal to be separated is present. The nominal holding time required to achieve the improved results will, however, continue to reduce until the amount of monocarboxylic acid actually present is within the range from about 0.1 to about 2.25 equivalents of monocarboxylic acid per mole of total metal to be separated. Use of an amount of monocarboxylic acid within this range is, therefore, preferred. The maximum amount of monocarboxylic acid that may be used is, of course, limited by the solubility of the monocarboxylic acid in the organic media in which the polymer is either dissolved or suspended.

In general, the metal or metals to be separated may be present in the polymer in virtually any form. For example, the metal or metals may be present as the metal per se or as a compound of the metal or metals which may be either soluble or insoluble in the organic media used to dissolve or suspend the polymer. Examples of metal compounds which would be insoluble in the organic media are the metal oxides, the metal halides, certain metal alkyl halides and the like. Examples of metal compounds that would be soluble in the organic media are certain metal alkyls, certain metal alkyl halides, various metal alkoxides, various metal carboxylates, various metal carbonyls and the like.

In general, any of the polymeric materials known in the prior art and containing one or more metals can be treated to separate the metals therefrom with the method of the present invention. As is well known, several polymers are prepared directly in either a solution or suspension process and polymers of this type may be treated directly after preparation thereof in accordance with the method of the present invention. The polymers prepared in bulk, in an organic reaction medium, or in the vapor phase would first have to be dissolved or suspended in a suitable organic medium prior to treatment in accordance with the method of the present invention. As is also well known, polymers prepared via any of these techniques may be further treated in solution, suspension or in bulk. Again, those polymers subsequently treated in either solution or suspension may be treated directly to separate metals therefrom using the method of the present invention. Polymers subsequently treated in bulk, however, must be dissolved or suspended in a suitable organic media prior to treatment in accordance with the method of this invention.

In general, the polymeric solutions and suspensions treated to separate metal or metals therefrom with the method of the present invention will comprise from about 5 wt % to about 50 wt % polymer and from about 95 wt % to about 50 wt % organic media. Generally, the polymeric solution or suspension will contain from about 100 to about 2,000 ppm by weight, of one or more metals, based on polymer.

As indicated supra, the polymeric solution or suspension will be contacted with an oxidizing agent either prior to or simultaneously with the contacting with the aqueous inorganic acid solution. When the polymer solution or suspension is contacted with the oxidizing agent prior to the contacting with the aqueous inorganic acid solution the contacting will be accomplished at a temperature within the range from about 50° to about 100° C., a pressure within the range from about 0 to about 100 psig and at a nominal holding time within the range from about 10 to about 90 minutes. When the oxidizing agent is a gaseous oxidizing agent, the contacting may be accomplished simply by bubbling the oxidizing agent through the polymer solution or suspension. When the oxidizing agent is liquid or a solid soluble in the organic media, the contacting may be accomplished simply by adding the oxidizing agent to the polymer solution or suspension. To facilitate contacting between the oxidizing agent and the metal or metal compounds, suitable agitation means may be employed.

While as indicated supra, the concentration of inorganic acid in aqueous solution is not critical so long as a sufficient amount of inorganic acid is used to effect the desired degree of metal separation, the aqueous solution will, generally, be from about 0.01 to about 1 normal in inorganic acid concentration and when the monocarboxylic acid is incorporated into the same or a different media, the monocarboxylic acid concentration will, generally, be within the range from about 0.001to about 0.02 normal. As also indicated supra, the monocarboxylic acid may be added directly to the polymer solution or suspension or the same may first be dissolved in an organic solvent and then contacted with the polymer solution or suspension. In any case, a sufficient amount of inorganic aqueous solution will be contacted with the polymer solution or suspension to effect the desired extent of metal separation. Generally, the amount of aqueous solution contacted with the polymer solution or suspension will be at least that required to effect complete conversion of the metal or metals to be separated on a stoichiometric basis although lesser amounts could be used if less than complete metal separation were desired. As also indicated supra, a sufficient amount of monocarboxylic acid will, generally, be added to provide from about 0.1 to about 2.25 mols of monocarboxylic acid per equivalent of total metal to be separated.

In general, contacting between the polymer solution or suspension and the inorganic acid or acids and the monocarboxylic acid or acids will be accomplished at a temperature within the range from about 50° to about 100° C. at a pressure sufficient to maintain the organic media in the liquid phase, generally, a pressure within the range from about 0 to about 100 psig. In general, contacting of the inorganic acid or acids and the monocarboxylic acid or acids with the polymer solution or suspension will be maintained for a nominal holding time within the range from about 10 to about 90 minutes. Sufficient agitation will be used to insure good contacting between the metal or metals and the inorganic acid or acids and the monocarboxylic acid or acids.

While the inventors still do not wish to be bound by any particular theory, it is believed that during the contacting of the polymer solution or suspension with an aqueous solution of an inorganic acid or acids in the presence of one or more monocarboxylic acids reaction occurs between the inorganic acid and acids and the metal or metals to form a salt. The salt, which is generally insoluble in the organic media is then transferred to the aqueous phase where it is soluble. While the monocarboxylic acid might also react with the metal or metals to be separated and passed into the aqueous phase, the salt formed with the monocarboxylic acid would be only slightly soluble in the aqueous media. As a result, the monocarboxylic acid salt anion would be displaced by an anion from the inorganic acid and the monocarboxylic acid would be restored. The monocarboxylic acid would then return to the organic phase where it would be soluble and where it could again react with a metal or metal compound. After such reaction, the monocarboxylic acid salt would again pass to the aqueous phase, surrender its metal ion to an inorganic acid anion and return to the organic media. The monocarboxylic acid or acids thus function as a phase transfer catalyst in the separation of the metal from the organic phase and transferring it to the aqueous phase. It will, of course, be appreciated that other mechanisms through which the monocarboxylic acid might facilitate transfer of the metal to the aqueous phase could be advocated but such mechanism is not critical to the present invention.

To the extent that contacting with the oxidizing agent is accomplished simultaneously with the contacting of the inorganic acid or acids and the monocarboxylic acid or acids with the polymer solution or suspension, the contacting may be accomplished simply by bubbling a gaseous oxidizing agent through the reaction medium during the contacting or simply by combining a liquid or soluble solid oxidizing agent into the reaction medium. Such addition could be effected separately or the oxidizing agent could be combined with the inorganic acid or acids and/or the monocarboxylic acid or acids. In any case, contacting with the oxidizing agent would be accomplished at the same conditions used to effect the contacting between the polymer solution or suspension and the inorganic acid or acids in the presence of a monocarboxylic acid or acids.

After the contacting between the polymer solution or suspension and the aqueous solution of at least the inorganic acid or acids, it will then be necessary to separate the aqueous phase which will contain most, if not all, of the metal or metals to be separated and the organic phase which will contain the polymer and the monocarboxylic acid or acids. In general, this separation may be accomplished using any of the means well known in the prior art. Such means include, but are not limited to, filtration, centrifugation, the use of a coalescing fibrous material and the like. To the extent that sufficient agitation was used during contacting to form an emulsion deemulsifying techniques known in the prior art may also be used. Such means include, but are not limited to, addition of one or more deemulsifying agents, such as methanol, isopropanol, and the like.

After separation of the organic phase and the aqueous phase has been completed, both the polymer and the monocarboxylic acid or acids may be recovered from the organic phase using conventional technology. For example, if the polymer is suspended in the organic media, the polymer may be separated simply by filtration. Similarly, if the polymer is dissolved in the organic media, the same generally, may be precipitated and then separated via filtration. Alternatively, the polymer may be recovered using flashing techniques, distillation and the like. The monocarboxylic acid or acids on the other hand, may be precipitated as a salt or similar compound and then separated via filtration, centrifugation, and the like. The recovered product may then be converted back to the monocarboxylic acid or acids and the monocarboxylic acid or acids thus produced reused in the separation process of this invention. Alternatively, the monocarboxylic acid or acids may be recovered directly using flashing techniques, distillation and the like.

As indicated supra, a surprising discovery of this invention is that the amount of water containing ionized metal entrained in the hydrocarbon phase after the organic and aqueous phases have been separated is significantly reduced when compared to the amount of aqueous phase containing ionized metal entrained in prior art separation techniques wherein an aqueous phase has been used. While the inventor does not wish to be bound by any particular theory, it is believed that the reduction in the amount of entrained aqueous phase is attributable directly to the presence of the higher molecular weight monocarboxylic acid or acids in the organic phase.

PREFERRED EMBODIMENT OF THE INVENTION

In a preferred embodiment of the present invention, a branched chain alkanoic acid containing from about 6 to about 10 carbon atoms, most preferably ethyl hexanoic acid, will be used in combination with a mineral acid, most preferably sulfuric acid, to separate a hydrogenation catalyst from a hydrogenated conjugated diolefin polymer, most preferably a block copolymer comprising at least one polymeric block containing predominantly monoalkenyl aromatic hydrocarbon monomer units and at least one polymeric block containing predominantly hydrogenated conjugated diolefin monomer units and even more preferably a block copolymer comprising a single styrene homopolymer block and a single isoprene homopolymer block. Polymers of this type are, of course, well known in the prior art and are described, for example in such patents as U.S. Pat. Nos. 3,554,911; 3,668,125; 3,772,196; 3,775,329; 3,835,053; 4,116,917 and 4,156,673, the disclosure of which patents are herein incorporated by reference.

In the preferred embodiment of the present invention, the polymer will be in solution when contacted with the inorganic acid and the monocarboxylic acid. Most preferably, the polymer will be dissolved in the same solvent that was used during hydrogenation. Preferred solvents includes aliphatic hydrocarbons such as pentane, hexane, heptane octane, 2-ethyl hexane, nonane and the like cyclic hydrocarbons such as cyclohexane, methylcyclohexane and the like and aromatic hydrocarbons such as benzene, toluene, ethyl benzene, xylene and the like. Cyclohexane will be used as the solvent in a most preferred embodiment of the present invention.

In the preferred embodiment, the method of this invention may be used to separate any of the hydrogenation catalysts known in the prior art. The method of this invention will, most preferably, be used to separate both metal components contained in hydrogenation catalyst such as those described in U.K. Patent Specification No. 1,030,306, the disclosure of which patent specification is herein incorporated by reference, and U.S. Pat. No. 3,700,633, the disclosure of which patent is herein incorporated by reference. The catalyst taught in the U.S. patent is, of course, the product obtained by combining a nickel or cobalt carboxylate or alkoxide with an aluminum alkyl. The method of this invention will, effectively, separate both metal components. Moreover, and to the extent that the polymer solution actually treated also contains the polymerization catalyst or catalyst residue, the method of this invention will also, effectively, reduce the content of such metal or metals in the polymer solution.

In the preferred embodiment of this invention, the branched chain alkanoic acid will be added directly to the polymer solution before the polymer solution is contacted with an aqueous solution containing the mineral acid. Air will be used as the oxidizing agent and contacting with the oxidizing agent will be accomplished simultaneously with the contacting with the aqueous inorganic acid solution. The contacting will be accomplished by, in effect, bubbling air or oxygen through the reaction medium.

In the preferred embodiment, from about 0.1 to about 0.5 mols of monocarboxylic acid per equivalent of total metal will be added to the polymer solution. The aqueous solution containing the inorganic, mineral, acid will be from about 0.01 to about 0.1 normal in acid. In the preferred embodiment, a sufficient amount of aqueous solution containing the inorganic acid will be used to provide from about 1 to about 10 times the stoichiometric amount of inorganic acid required to react with all of the metals contained in the polymer solution.

In the preferred embodiment, contacting between the polymer solution and the aqueous solution containing the inorganic acid will be accomplished at a temperature within the range from about 50° to about 100° C. at a pressure within the range from about 0 to about 100 psig. In the preferred embodiment, the partial pressure of oxygen will be maintained at a value within the range from about 0.1 to about 10 psig. In the preferred embodiment, contacting between the polymeric solution and the aqueous solution of the inorganic acid will be accomplished with sufficient agitation to insure good contacting between the polymer solution and the aqueous inorganic solution but the amount of agitation will not be sufficient to form an emulsion. In the preferred embodiment, contacting between the polymer solution and the inorganic acid aqueous solution will be maintained for a nominal holding (time within the range from about 10 to about 90 minutes.

Having thus broadly described the present invention. a preferred and most preferred embodiment thereof, it is believed that the invention will become even more apparent by reference to the following examples. It will be appreciated, however, that the examples are presented solely for purposes of illustration and should not be construed as limiting the invention.

EXAMPLE 1

In this Example, two runs were completed, in batch equipment, to separate a hydrogenation catalyst from a freshly hydrogenated polymer cement containing said catalyst. Each run consisted of a first contacting step followed by separation o: the two phases, and a second contacting step followed by separation of the two phases. In both contacting steps of the first of these runs, ethyl hexanoic acid was used in combination with sulfuric acid and in both contacting steps of the second run, which was completed for comparison purposes only, only sulfuric acid was used. In both runs, the freshly hydrogenated polymer was a star-shaped polymer having about 20 polyisoprene arms having a weight average molecular weight of about 80,000. The nucleus of the star was formed with a commercial grade divinyl benzene. At the start of both runs, 100 grams of the hydrogenated polymer cement containing 10 wt % polymer dissolved in 90 grams of cyclohexane were charged to a shaker which was operated at a low speed. In both runs, the polymer cement initially contained 2400 ppm, by weight, nickel, based on polymer, and 2,500 ppm, by weight, based on polymer, of aluminum. In both contacting steps of both runs, the polymer cement was contacted with a sufficient amount of aqueous sulfuric acid solution to provide 5 moles of sulfuric acid per equivalent of combined nickel and aluminum, initially. The volume ratio of aqueous phase to organic phase in both contacting steps of both runs was 0.5. In the first of these two runs, 0.2 grams of ethyl hexanoic acid was combined with the polymer cement before the sulfuric acid solution was added to the shaker and before both contacting steps. In the second run, the sulfuric acid aqueous solution was used alone in both contacting steps. In both runs, the contacting was continued for 30 minutes in each contacting step and the organic and aqueous phases were then separated by decanting after the mixture was allowed to settle for 60 minutes. In both runs, each contacting step was accomplished at room temperature and pressure. The viscosity of the polymer solution used in both runs was 760 cp at room temperature. After this first contacting step was completed and the phases separated, the organic phase was tested to determine the amount of nickel remaining after the first contacting and then the entire procedure repeated. After the second separation step was completed, the organic phase was again tested to determine the amount of nickel remaining therein and to determine the amount of aqueous phase entrained in the organic phase. In the first run, the amount of nickel remaining in the organic phase after the first separation was 39 ppm, by weight, based on polymer. After the second contacting, the amount of nickel remaining in the organic phase was determined to be 40 ppm by weight, based on polymer. 0.2 wt % of the aqueous phase was entrained in the organic phase after the second separation was completed. In the second run, 517 ppm, by weight, based on polymer, of nickel remained in the organic phase after the first contacting. After the second contacting, 150 ppm, by weight, based on polymer, of nickel remained in the organic phase. 2.7 wt % of the aqueous phase was entrained in the organic phase after separation. As will be readily apparent from these results, the addition of 20,000 ppm, by weight, based on a polymer, of 2-ethyl hexanoic acid significantly increases the amount of nickel separated from the polymer solution and at the same time significantly reduces the amount of the aqueous phase entrained in the organic phase. In both runs, and during both contacting periods, oxygen was supplied through equilibration of the gas cap with the reaction medium.

EXAMPLE 2

In this Example, four runs, each involving two contacting steps, were completed. In all four runs, an aqueous solution containing sulfuric acid was contacted with a hydrogenated polymer cement containing residues of a catalyst formed by combining nickel octoate with triethyl aluminum. The polymer cement was identical to that used in Example 1 except that its viscosity was only 420 cp and it contained only 2,200 ppm, by weight, based on polymer of nickel and 2,300 ppm, by weight, based on polymer of aluminum. In both contacting steps of all four runs, a sufficient amount of an aqueous solution containing sulfuric acid was contacted with the polymer cement to provide 4 mols of sulfuric acid per equivalent of combined metal (nickel+aluminum) initially present in the polymer cement. All four runs were completed by charging 35 pounds of the polymer cement to a 30 gal mixer and then adding the aqueous sulfuric acid solution. In the first run, 32 grams of ethyl hexanoic acid were added to the polymer cement before the aqueous sulfuric acid solution was added and before both contacting steps. In the second run, only 8 gms of ethyl hexanoic acid were added before each contacting step was completed. In the third run, 8 grams of ethyl hexanol, an alcohol frequently used to prevent entrainment of the aqueous phase in the organic phase, was added to the polymer cement before the aqueous sulfuric acid solution was added in both contacting steps. In the fourth run, the aqueous solution of sulfuric acid was the only reagent added during both contacting steps. In all four runs, oxygen was bubbled through the reaction mixture during both contacting steps. In all four runs, the impeller was operated at a speed of 200 rpm. Again, two contacting steps were completed in each run and the organic and aqueous phases were separated after each contacting period. In all of the runs, each of the contacting periods was continued for 30 minutes and separation of the organic phase and the aqueous phase was accomplished by decanting after settling for 60 minutes. After each contacting period was completed, the amount of nickel remaining in the organic phase and the amount of aqueous phase entrained in the organic phase was determined. The amount of nickel remaining in the organic phase after each contacting was as follows: 62 ppm, by weight, based on polymer and 38 ppm, by weight, based on polymer, respectively, in the first run when 2-ethyl hexanoic acid was used at 25,000 ppm by weight, based on polymer; 38 ppm, by weight, based on polymer and 12 ppm, by weight, based on polymer, respectively, in the second run where 6,200 ppm, by weight, based on polymer, of 2-ethyl hexanoic acid was used; 225 ppm, by weight, based on polymer and 62 ppm, by weight, based on polymer, respectively, in run three when 6,200 ppm, by weight, based on polymer, of 2-ethyl hexanol was used; and 312 ppm, by weight, based on polymer, and 62 ppm by weight, based on polymer respectively, when sulfuric acid alone was used. The amount of aqueous phase entrained in the organic phase after each contacting period was as follows: 0.1 wt % and 0.4 wt %, respectively, in run 1 when 25,000 ppm, by weight, based on polymer, of 2-ethyl hexanoic acid was used; 0.6 wt % and 0.4 wt % respectively, in run 2 when 6,200 ppm, by weight, based on polymer of 2-ethyl hexanoic acid was used; 1.2 wt % and 0.6 wt %, respectively, in run three when 6,200 ppm of 2-ethyl hexanol was used; and b 1.5 wt % and 0.6 wt % respectively, in run 4 where sulfuric acid was used alone. As will be apparent from this data, 2-ethyl hexanoic acid significantly increases the amount of nickel separated from the organic phase and significantly reduces the amount of the aqueous phase entrained in the organic phase at both concentrations at which 2-ethyl hexanoic acid was used.

While the present invention has been described and illustrated by reference to particular embodiments thereof, it will be appreciated by those of ordinary skill in the art that the same lends itself to variations not necessarily described or illustrated herein. For this reason, then, reference should be made solely to the appended claims for purposes of determining the true scope of this invention.

Having thus described and illustrated this invention, what is claimed is:

1. A method for separating metals from a polymer comprising the steps of:
    (a) contacting a solution or suspension of a polymer and metals introduced as a hydrogenation catalyst in an organic media with an oxidizing agent;
    (b) contacting said solution or suspension of said polymer and said metals with an aqueous solution of an inorganic acid in the presence of a monocarboxylic acid having from about 6 to about 20 carbon atoms; and
    (c) recovering a polymer product having a reduced amount of metal therein.

2. The method of claim 1 wherein said inorganic acid is a mineral acid.

3. The method of claim 2 wherein said mineral acid is sulfuric acid.

4. The method of claim 1 wherein said monocarboxylic acid is a branched chained alkanoic acid having from about 6 to about 10 carbon atoms.

5. The method of claim 1 wherein steps (a) and (b) are accomplished simultaneously.

6. The method of claim 1 wherein step (b) is accomplished in a plurality of steps.

7. The method of claim 1 wherein said monocarboxylic acid is significantly more soluble in an organic media than in an inorganic media.

8. The method of claim 1 wherein step (a) is accomplished at a temperature within the range from about 50° to about 100° C., a pressure within the range from about 0 to about 100 psig and at a nominal holding time within the range from about 10 to about 90 minutes.

9. The method of claim 1 wherein step (b) is accomplished at a temperature within the range from about 50° to about 100° C., a pressure within the range from about 0 to about 100 psig and at a nominal holding time within the range from about 10 to about 90 minutes.

10. The method of claim 1 wherein said polymer is a block copolymer comprising at least one polymeric block containing predominantly monoalkenyl aromatic hydrocarbon monomer units and at least one polymeric block containing predominantly hydrogenated, conjugated diolefin monomer units.

11. The method of claim 10 wherein said polymer is in solution.

12. The method of claim 11 wherein a sufficient amount of aqueous solution containing the inorganic acid will be used to provide from about 1 to about 10 times the stoichiometric amount of inorganic acid required to react with all of the metals contained in the polymer solution.

13. The process of claim 12 wherein said monocarboxylic acid is ethylhexanoic acid.

* * * * *